Jan. 15, 1935.  R. C. GREGG  1,987,848
LAMP STAND
Filed Dec. 9, 1933
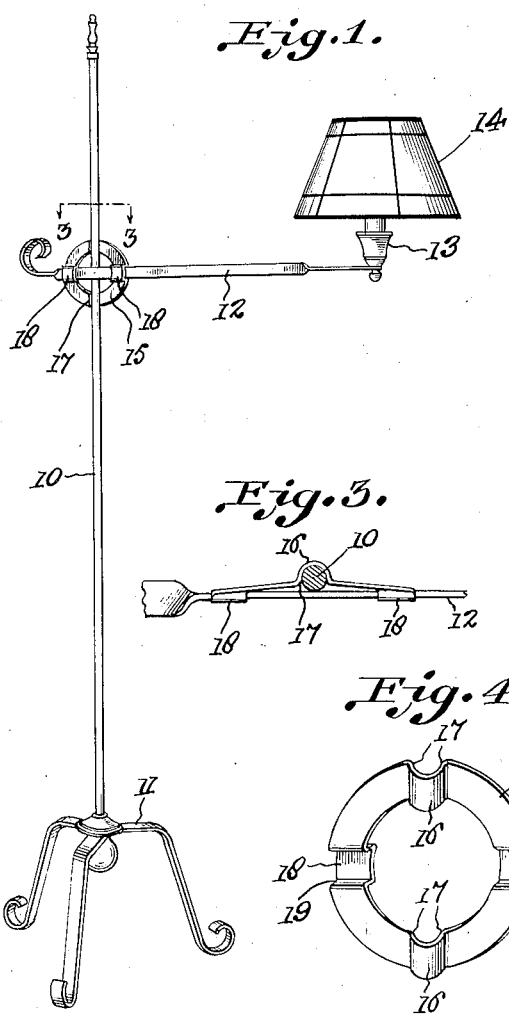
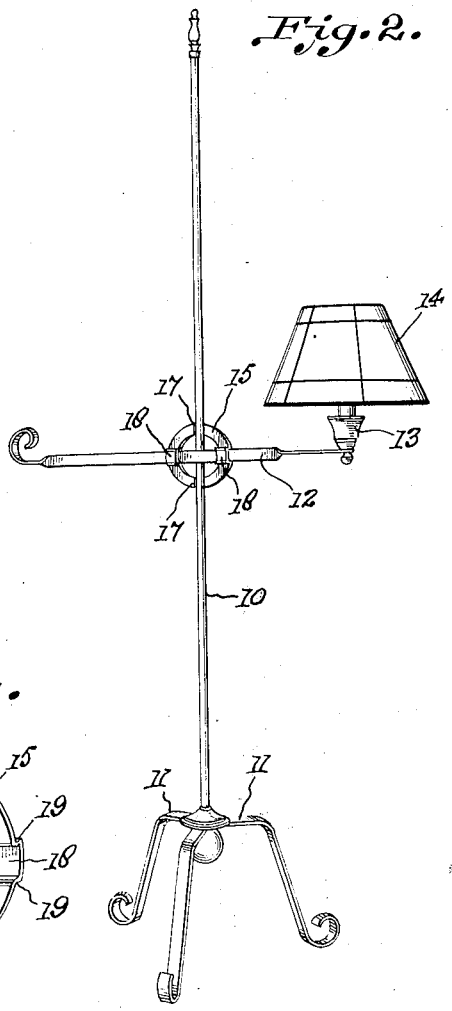
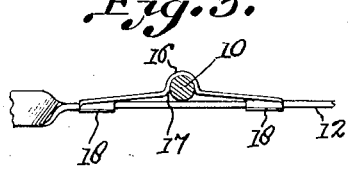
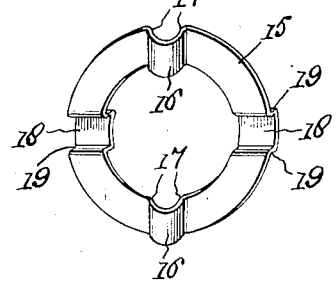
Inventor
Roscoe C. Gregg
By Mawhinney & Mawhinney,
Attorneys Patented Jan. 15, 1935

1,987,848

UNITED STATES PATENT OFFICE 1,987,848

LAMP STAND

Roscoe C. Gregg, Fredericktown, Ohio

Application December 9, 1933, Serial No. 701,687

3 Claims. (Cl. 248—7)

The present invention relates to stands or supports for lamps and the like, and has for an object to provide an improved coupling and holding device for adjustably and yieldably holding crossed members together, so that the latter may be relatively adjusted lengthwise of the members to accommodate the stand to various heights and other conditions.

Another object of the present invention is to provide a lamp stand having a standard and a cross arm with a resilient coupling device arranged to slidably and frictionally embrace both the standard and the cross arm so that the cross arm with the device may be slid vertically on the standard into different heights and be yieldably held in adjusted position as to height, and wherein the cross arm may be slid against the standard and the coupling device so as to project the cross arm into various distances from the standard so that the cross arm will be yieldably held in such adjusted position.

The invention has for a further object the provision of a ring-like resilient device which may be made in one piece and be easily assembled with respect to the crossed members of a stand or support, and which is adapted for various configurations for ornamental and like purposes and which will hold the crossed members at a desired angle and yieldingly maintain the members in relatively adjusted positions relative to their crossed positions.

The invention also aims to provide a simplified and economical structure which may be utilized in stands, holders or supports of various constructions for lamps, flower racks, bird cages, telephones and other uses, and wherein no set screws or other separate fastening devices are required, but wherein the structure of the coupling member is such as to afford the necessary surface area of frictional contact between the parts to yieldingly hold them when adjusted.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a perspective view of a lamp stand embodying the features of the present invention and showing the cross arm in one position of adjustment.

Figure 2 is a similar view showing another position of adjustment of the cross arm on the standard.

Figure 3 is a fragmentary enlarged cross section taken through the upper portion of the stand on the line 3—3 of Figure 1, and Figure 4 is a detail perspective view of the friction coupling element.

Referring now to the drawing, the invention is disclosed in the present instance as embodied in the lamp stand having a standard 10 mounted on a base portion 11 of any suitable configuration. The stand 10 is of any suitable height and supports an outstanding arm 12 which may be disposed horizontally or otherwise in accordance with the requirement of the stand or support and which in the present instance may comprise a flat bar which engages across one side of the standard 10, the latter being cylindrical or of any suitable configuration. The arm 12 is shown in the present instance as carrying a lamp 13 of any suitable construction having a lamp shade 14 and the lamp and its shade may be supported at any desired height on the standard 10 and at any distance outwardly therefrom.

The friction coupling element 15, shown in detail in Figure 4, comprises a substantially open frame which may be circular or ring shape as shown, or of any other desired configuration. The friction element is provided at opposed points with a pair of laterally depressed or offset sockets 16 having each an inner wall adapted to fit about or against one side of the standard 10 so as to provide the required area extent of frictional contact between the element 15 and the standard 10.

As shown in Figure 3, the sockets 16 embrace the standard 10 sufficiently to provide abutting or stop shoulders 17 at opposite sides of the socket to engage the standard and hold the friction element 10 from turning circumferentially thereon in the plane of the element. At intermediate opposed points the frame element 15 is provided with sockets 18 which are depressed from the body portion of the element in a direction opposite to that of the sockets 16 and which are shaped to the general configuration of the arm 12 for receiving the arm therethrough. The sockets 18 are also of sufficient depth to provide stop shoulders 19 adapted to engage the opposite edge portions of the arm 12 and hold the holder from turning with respect to the axis of the friction element 15.

From Figure 3, it will be noted that the sockets of the friction element 15 are relatively shallow as compared with the crossed members so that the body portion of the friction element 15 when engaged with the crossed members is slightly sprung to yieldingly bind against the outer or remote sides of the crossed elements and thus yieldingly hold the elements in surface contact at their crossed portions. The body portion of the element 15 is constructed of suitable material and is of sufficient thickness to insure the desired inherent resiliency of the friction element for binding the standard 10 and the arm 12 not only against each other but also in their respective sockets 16 and 18 of the friction element.

It is apparent that a friction element of this construction may be economically produced by stamping or the like and that the standard 10 and arm 12 may be readily assembled in the friction element as the standard 10 is threaded through its sockets 16 with its exposed side engaging the exposed side of the arm 12 with reference to the sockets 16 and 18. In other words, the standard 10 holds the arm 12 in the sockets 18 while the arm 12 holds the standard 10 in its sockets 16.

To adjust the height of the stand it is only necessary to force the friction element 15 vertically along the standard 10, while to adjust the projection of the arm 12 from the standard 10 it is only necessary to force the arm 12 through the friction element 15. In comparing Figures 1 and 2 of the drawing it is apparent that the arm 12 may be moved down on the standard 10 and at the same time the arm 12 may be forced inwardly so as to project but a short distance from the standard 10.

It is obvious that various changes and modifications may be made in the details of construction and design of the above specifically described embodiment of this invention without departing from the spirit thereof, such changes and modifications being restricted only by the scope of the following claims.

What is claimed is:—

1. A stand comprising a standard, a flat arm disposed across one side of the standard and extending at an angle therefrom, and a friction coupling element having an open central portion with opposed sockets opening through one side of the element to receive the standard and having opposed intermediate sockets opening through the opposite side of the element for receiving the arm therethrough, said intermediate sockets holding the arm against turning about an axis at right angles to the length of the standard.

2. A stand comprising a standard, an arm engaging across one side of the standard and having a flat side confronting the standard, and a friction coupling element comprising a resilient body frame open at its central portion and having opposed socket portions opening through one side of the element and engaging against one side of the standard, said body portion having a pair of opposed intermediate sockets opening through the opposite side of the element and embracing the arm at spaced points from the opposite sides of the standard, said intermediate sockets holding the arm against turning about an axis at right angles to the length of the standard.

3. A stand comprising a standard of cylindrical contour, a supporting arm having a relatively flat body portion engaging across one side of the standard and adapted to be slid vertically on the standard to dispose the arm at various heights and to be slid crosswise of the standard to project the arm at different distances from the side of the standard, and a combined coupling, holding and bracing ring threaded over the standard and the arm and having open oppositely facing and alternately disposed bearing portions for engaging the standard and the arm at spaced points disposed at opposite sides of the point of contact of the standard and the arm for yieldingly binding the arm against the standard and frictionally binding both the standard and the arm yieldingly in the ring.

ROSCOE C. GREGG.